Feb. 23, 1932.                W. H. TRAVER                1,846,163
                              POLISHING TOOL
                            Filed Dec. 16, 1930

Inventor
Wallace H. Traver
By E. Walton Brewington
Attorney

Patented Feb. 23, 1932

1,846,163

UNITED STATES PATENT OFFICE

WALLACE H. TRAVER, OF BALTIMORE, MARYLAND

POLISHING TOOL

Application filed December 16, 1930. Serial No. 502,709.

This invention relates to polishing devices and has special reference to a polishing device employing rotary polishers.

One important object of the invention is to provide an improved general construction of devices of this character.

A second important object of the invention is to provide a novel frame on which the polishers are mounted.

A third important object of the invention is to provide a novel arrangement of polishers and mounting therefor wherein worn and used up polishers may be removed readily and new ones substituted in their places.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1:
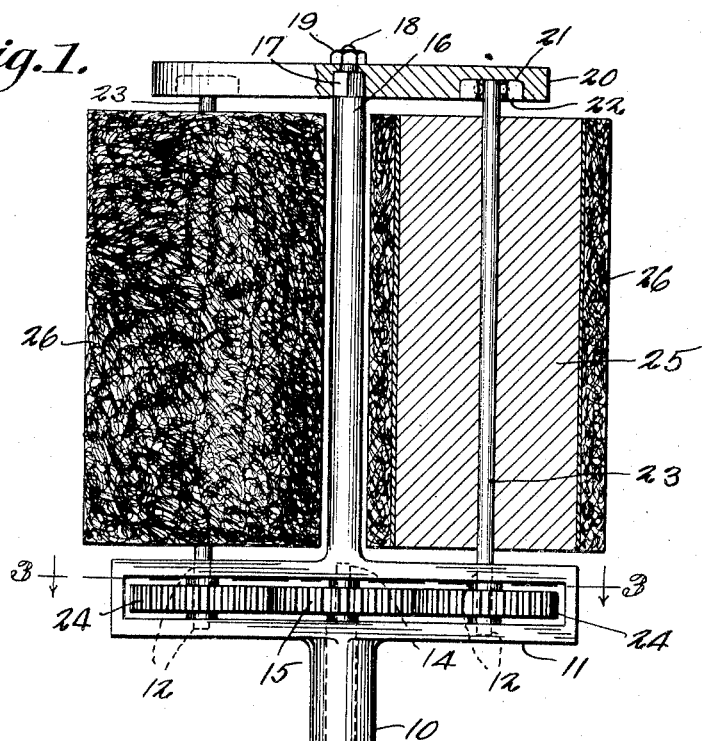
Figure 1 is a side elevation, partly in section, of the improved polisher.
Figure 2:
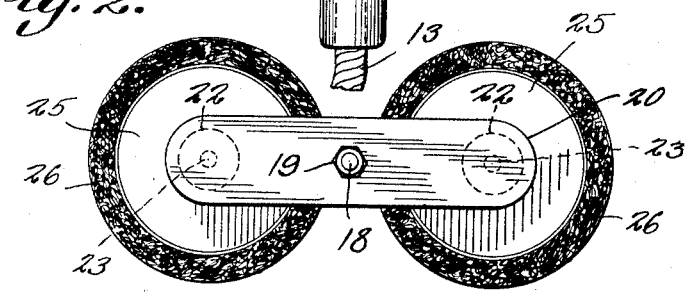
Figure 2 is an end view thereof.
Figure 3:
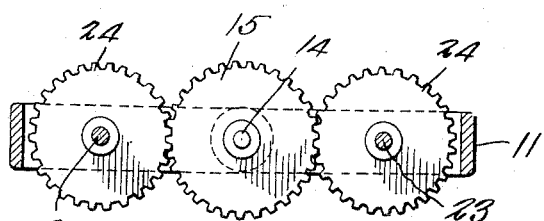
Figure 3 is a section on the line 3—3 of Figure 1.

In the embodiment of the invention here shown there is provided a tubular handle 10 on the forward end of which is formed a transversely extending rectangular frame 11 having its transverse sides provided with pairs of journal bearings 12. One pair of these bearings is arranged in axial alinement with the handle 10 and the remaining pairs are equally spaced from the first mentioned pair. Housed in the handle 10 is the end of a flexible shaft 13 having a rigid terminal position 14 journalled in the first mentioned pair of bearings and having a gear 15 mounted thereon within the frame 11.

Extending forwardly from the frame 11 is a support or shank 16 which is axially alined with the handle 10 and this shank has a square 17 formed adjacent its forward terminal portion 18 which is threaded for the reception of a nut 19. An end plate 20 is arranged to fit on the square 17 and be there held by the nut 19. Recesses 21 are formed in this end plate in confronting and alined relation with the lateral bearings 12 and in these recesses are mounted ball bearings 22. Journalled in these ball bearings and in the lateral bearings 12 are shafts 23 each of which carries, within the frame 11, a gear 24 which meshes with the gear 15. Thus the shafts revolve in the same direction.

Each polisher consists of a central core or body 25 of cylindrical form and having a polishing covering 26 fitting around the cylindrical surface of this core. Each core or body is provided with an axial opening receiving the respective shaft 23 which frictionally engages the core so that the polishers will rotate with the shafts 23. However, when these polishers are used up the end plate 20 may be removed and the polishers drawn off the shafts 23 and new polishers placed thereon, the end plate being, of course, replaced. It will be noted that, by reason of the polishers revolving in the same direction they may be applied to an object such as a shoe without there being any tendency either to draw the object into the space between the polishers or to force it away therefrom. It is obvious that the flexible shaft is to be driven by suitable means such as an electric motor or other motive device.

There has thus been provided a simple and efficient device of the kind described and for the purpose specified.

It is obvious that minor changes may be made in the form and construction of the device without departing from the principles involved. It is therefore desired to include, as the invention, all forms which properly come within the scope claimed.

Having thus described the invention, what is claimed is:—

In a device of the kind described, a rectangular frame extending transversely of the device, a driving gear journalled centrally of said frame, lateral shafts extending in parallelism forwardly from the frame and having their rear ends journalled therein, gears on said shafts within said frame and meshing with the driving gear, polishing cylinders mounted on said shafts forward of said frame, a shank extending forwardly from said frame in axial alinement with the driving gear, an end plate mounted detachably on the forward end of said shank, a nut carried by the extremity of the shank to hold the end plate removably in position, said plate having recesses in its rear face axially alined with said lateral shafts, and bearings mounted in said recesses and having the lateral shafts journalled therein.

In testimony whereof I affix my signature.

WALLACE H. TRAVER.